(12) United States Patent
Hemphill et al.

(10) Patent No.: US 7,452,473 B1
(45) Date of Patent: Nov. 18, 2008

(54) LASER MARKING OF RAW ALUMINUM ANODE FOIL TO INDUCE UNIFORM PATTERNING ETCHING

(75) Inventors: R. Jason Hemphill, Pickens, SC (US); Xiaofei Jiang, Liberty, SC (US); Tearl Stocker, Easley, SC (US); Gary D. Thompson, Simpsonville, SC (US); Thomas F. Strange, Easley, SC (US); Bruce Ribble, Easley, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 360 days.

(21) Appl. No.: 10/940,793

(22) Filed: Sep. 13, 2004

Related U.S. Application Data

(63) Continuation-in-part of application No. 10/680,777, filed on Oct. 6, 2003, now abandoned.

(51) Int. Cl.
*H01G 4/00* (2006.01)
*C23F 1/00* (2006.01)
*C23F 3/00* (2006.01)

(52) U.S. Cl. .............................. 216/6; 216/87; 216/94; 205/640

(58) Field of Classification Search ..................... 216/6, 216/55, 87; 430/311, 313; 148/512; 205/640
See application file for complete search history.

(56) References Cited

U.S. PATENT DOCUMENTS

| | | |
|---|---|---|
| 3,622,843 A | 11/1971 | Vermiyea |
| 3,779,877 A | 12/1973 | Alwitt ........................ 205/660 |
| 3,872,579 A | 3/1975 | Papadopoulous |
| 4,213,835 A | 7/1980 | Fickelscher |

(Continued)

FOREIGN PATENT DOCUMENTS

JP 59083772 A 5/1984

(Continued)

OTHER PUBLICATIONS

USPTO English Translation of JP 59-083772; made by USPTO Translator on Nov. 1, 2004.*

(Continued)

*Primary Examiner*—Parviz Hassanzadeh
*Assistant Examiner*—Maureen G Arancibia
(74) *Attorney, Agent, or Firm*—Steven M. Mitchell

(57) ABSTRACT

A method of producing a highly etched electrode for a capacitor from a foil is disclosed. The method comprises first applying a laser beam to the foil to form a plurality of marks on the foil surface and then etching the foil. Preferably, the laser marks facilitate etching of foil surface in areas near the marks and retard etching of foil surface inside the marks. After etching, the foil is further processed in a combination of optional steps such as forming and finishing steps. The laser marking of the foil allows for positional control of tunnel initiation, such that tunnel initiation density and the location of tunnel initiation is controlled. By controlling the position of tunnel initiation, foils are etched more uniformly and have optimum tunnel distributions, thus allows for the production of highly etched foils that maintain high strength and have high capacitance. The present invention further includes an electrolytic capacitor comprising etched aluminum anode foils, which have been prepared using the methods of the present invention.

23 Claims, 13 Drawing Sheets

U.S. PATENT DOCUMENTS

| | | | |
|---|---|---|---|
| 4,266,332 A | 5/1981 | Markarian et al. | |
| 4,420,367 A | 12/1983 | Löcher | |
| 4,474,657 A | 10/1984 | Arora | |
| 4,481,084 A | 11/1984 | Chen et al. | 205/153 |
| 4,518,471 A | 5/1985 | Arora | |
| 4,525,249 A | 6/1985 | Arora | |
| 4,541,037 A | 9/1985 | Ross et al. | |
| 4,593,343 A | 6/1986 | Ross | |
| 4,663,824 A | 5/1987 | Kenmochi | |
| 4,696,082 A | 9/1987 | Fonfria | |
| 5,522,851 A | 6/1996 | Fayram | |
| 5,660,737 A | 8/1997 | Elias et al. | 216/6 |
| 5,715,133 A | 2/1998 | Harrington et al. | 361/500 |
| 6,168,706 B1 | 1/2001 | Hemphill et al. | 205/675 |
| 6,224,738 B1 | 5/2001 | Sudduth et al. | 205/221 |
| 6,426,864 B1 | 7/2002 | O'Phelan et al. | 361/509 |
| 6,802,954 B1 | 10/2004 | Hemphill et al. | 205/640 |
| 2002/0111029 A1 | 8/2002 | Johnson | 438/707 |

FOREIGN PATENT DOCUMENTS

| | | |
|---|---|---|
| JP | 02075155 A | 3/1990 |
| JP | 07049428 A | 2/1995 |

OTHER PUBLICATIONS

Patel, et al.; "A New Coating Process of Aluminum"; posted on Oct. 25, 2000 on http://www.ceramicindustry.com. Downloaded from http://www.ceramicindustry.com/CDA/ArticleInformation/features/BNP_Features_Item/0,2710,13647,00.html on Oct. 21, 2004.

\* cited by examiner

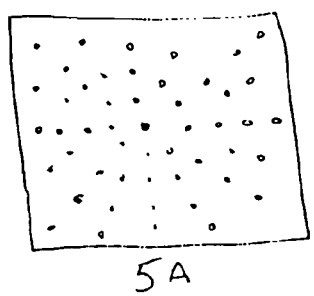
5A
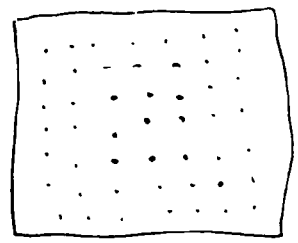
5B
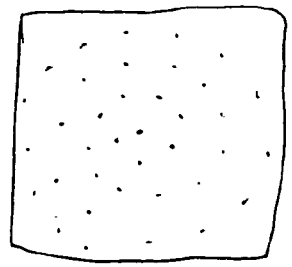
5C
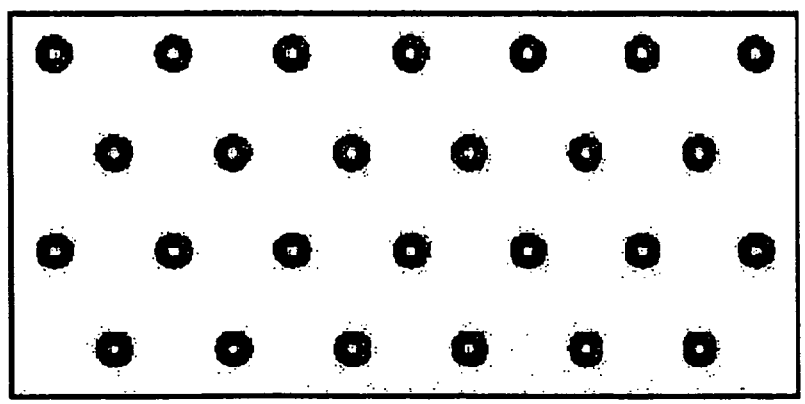
5D
FIGS. 5A-D

LASER MARKING OF RAW ALUMINUM ANODE FOIL TO INDUCE UNIFORM PATTERNING ETCHING

PRIORITY CLAIM

This application is a continuation-in-part of U.S. patent application Ser. No. 10/680,777 filed Oct. 6, 2003 now abandoned and is incorporated herein by referenced.

BACKGROUND OF THE INVENTION

1. Field of the Invention

The present invention is directed to a method of producing an electrode for use in the manufacture of electrolytic capacitors and more particularly to a method of creating porous electrode foil for use in multiple electrode stack configuration electrolytic capacitors of the type used in implantable cardioverter defibrillators (ICDs).

2. Related Art

Compact, high voltage capacitors are utilized as energy storage reservoirs in many applications, including implantable medical devices. These capacitors are required to have a high energy density since it is desirable to minimize the overall size of the implanted device. This is particularly true of an implantable cardioverter defibrillator (ICD), also referred to as an implantable defibrillator, since the high voltage capacitors used to deliver the defibrillation pulse can occupy as much as one third of the ICD volume.

Electrolytic capacitors are used in ICDs because they have the most near ideal properties in terms of size and ability to withstand relatively high voltage. Conventionally, an electrolytic capacitor includes an etched aluminum foil anode, an aluminum foil or film cathode, and an interposed kraft paper or fabric gauze separator impregnated with a solvent-based liquid electrolyte. The electrolyte impregnated in the separator functions as the cathode in continuity with the cathode foil, while an oxide layer on the anode foil functions as the dielectric. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, composing a planar, layered, stack structure of electrode materials with separators interposed therebetween.

Since these capacitors must typically store approximately 30-40 joules, their size can be relatively large, and it is difficult to package them in a small implantable device. Currently available ICDs are relatively large (over 44 cubic centimeters (cc)), generally rectangular devices about 12-16 millimeters (mm) thick. A patient who has a device implanted may often be bothered by the presence of the large object in his or her pectoral region. Furthermore, the generally rectangular shape can in some instances lead to pocket erosion at the somewhat curved corners of the device. For the comfort of the patient, it is desirable to make smaller and more rounded ICDs. The size and configuration of the capacitors has been a major stumbling block in achieving this goal.

In ICDs, as in other applications where space is a critical design element, it is desirable to use capacitors with the greatest possible capacitance per unit volume. Since the capacitance of an electrolytic capacitor increases with the surface area of its electrodes, increasing the surface area of the aluminum anode foil results in increased capacitance per unit volume of the electrolytic capacitor. By electrolytically etching aluminum foils, an enlargement of a surface area of the foil will occur. As a result of this enlargement of the surface area, electrolytic capacitors, which are manufactured with the etched foils, can obtain a given capacity with a smaller volume than an electrolytic capacitor, which utilizes a foil with an unetched surface.

In a conventional electrolytic etching process, surface area of the foil is increased by removing portions of the aluminum foil to create etch tunnels. The foil used for such etching is typically an etchable aluminum strip of high cubicity. High cubicity in the present context is where at least approximately 85% of crystalline aluminum structure is oriented in a normal position (i.e., a (1,0,0) orientation) relative to the surface of the foil. Such foils are well known in the art and are readily available from commercial sources. While electrolytic capacitors having anodes and cathodes comprised of aluminum foil are most common, anode and cathode foils of other conventional metals such as titanium, tantalum, magnesium, niobium, zirconium and zinc are also used.

U.S. Pat. No. 4,213,835 to Fickelscher discloses a method for electrolytically etching a recrystallized aluminum foil which allows manufacture of foils with exclusively pure cylindrical or cubical etching structures and tunnel densities greater than $10^7/cm^2$ with an avoidance of irregular pitting of the foil. The method consists of providing an etching bath containing chloride ions, positioning the foil in the bath and potentiostatically etching the foil with a temporally constant anode potential. The preferred etching step occurs in two stages. In the first stage, the etching current density is set above the potential or current density, which creates pitting of the aluminum. After an induction period of around 10 seconds, the etching tunnels grow autocatalytically at a rate of several μm/s with a pore diameter of approximately 0.2 μm in the crystal oriented direction (i.e., a (1,0,0) orientation relative to the surface of the foil). After approximately one minute of exclusive tunnel formation and in order to avoid the occurrence of coarse pitting, the etching current density is reduced. In the second stage, the current density is set below the current density, which creates pitting of the aluminum, such that only pore or tunnel enlargement up to the desired value will occur. Thus, the etching time for the tunnel enlargement is relatively long in relation to the etching time for obtaining the tunnel structure in the foil.

U.S. Pat. No. 4,420,367 to Löcher discloses a similar method for etching aluminum foil for electrolytic capacitors. Electrolytic tunnel formation is carried out in a first etching stage, as described above. However, the further etching for tunnel enlargement is non-electrolytic, taking place chemically in one or several etching stages. The method is preferably carried out in a halogen-free or chloride-free solution having nitrate ions, such as $HNO_3$ and/or $Al(NO_3)_3$.

U.S. Pat. Nos. 4,474,657, 4,518,471 and 4,525,249 to Arora disclose the etching of aluminum electrolytic capacitor foil by passing the foil through an electrolyte bath. The preferred bath contains 3% hydrochloric acid and 1% aluminum as aluminum chloride. The etching is carried out under a direct current (DC) and at a temperature of 75° C. U.S. Pat. No. 4,474,657 is limited to the above single step. U.S. Pat. No. 4,518,471 adds a second step where the etched foil is treated in a similar bath with a lower current density and at a temperature of 80-82.5° C. U.S. Pat. No. 4,525,249 adds a different second step, where the etched foil is treated in a bath of 8% nitric acid and 2.6% aluminum as a nitrate, at a temperature of 85° C.

The ideal etching structure is a pure tunnel-like etching with defined and uniform tunnel diameters and without any undesirable pitting of the foil. As tunnel density (i.e., the number of tunnels per square centimeter) is increased, a corresponding enlargement of the overall surface area will occur. Larger surface area results in higher overall capacitance. However, high gain etching of valve metals for use as anodes in electrolytic capacitors tend to produce very brittle anode foil. Typically the higher the gain of the anode foil, the more brittle the foil. In particular, the brittleness of the foil and its capacitance are both proportional to the depth of the etching and the density of the etch pits, i.e., the number per unit area. Accordingly, the capacitance and thereby the energy density are limited by the brittleness of the formed foil. As the brittleness of the formed foil increases, cracks formed in the foil more easily propagate across the foil, resulting in broken anodes. Therefore, there is a need for an improved method for etching anode foil that increases foil capacitance without decreasing foil strength.

SUMMARY OF THE INVENTION

The present invention relates to a method for producing a highly etched foil, comprising applying a laser beam to a portion of the foil to form a plurality of marks on the foil; and etching the foil. Preferably, the laser marks facilitate etching of the foil surface in areas near the marks and retard etching of the foil surface inside the marks. The marks applied can be any shape and arrangement, preferably the marks are circular dots in a regular pattern. After etching, the foil is further processed in a combination of optional steps such as forming and finishing steps.

The laser marking of the foil allows for positional control of tunnel initiation. By controlling the position of tunnel initiation, foils are etched more uniformly and have optimum tunnel distributions, this allows for the production of highly etched foils that maintain high strength and have high capacitance. The present invention further includes an electrolytic capacitor comprising etched aluminum anode foils, which have been prepared using the methods of the present invention, and an ICD with the electrolytic capacitor comprising anode foils etched according to the present invention.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to illustrate exemplary embodiments of the invention and are incorporated in and constitute a part of this specification, illustrate embodiments of the invention and together with the description serve to explain the principles of the invention. In the drawings:

FIGS. 5A-5D show alternative patterns for marking a foil using methods of the present invention.

Figure 1:
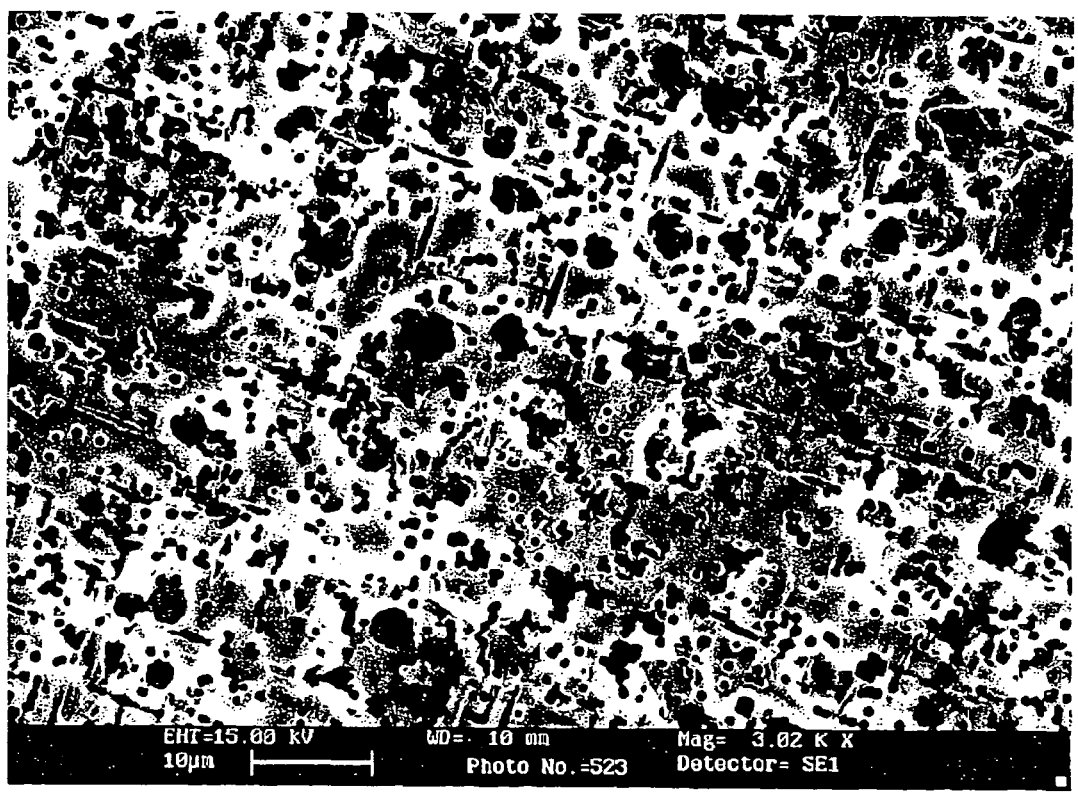
FIG. 1 is a Scanning Electron Microscope (SEM) picture of an aluminum foil electrochemically etched and widened using conventional methods.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Reference will now be made in detail to the embodiments of the present invention, examples of which are illustrated in the accompanying drawings.

Electrochemical etching of metal foil increases foil surface area and increases anodic foil capacitance. During the etching process tunnels are formed, by the electrochemical dissolution of metal from the foil, in the [1,0,0] direction, thereby increasing overall foil surface area. It is critical to control the morphology of the tunnels and their distribution, as tunnel morphology dictates increases in surface area and capacitance. Tunnel morphology depends on the etch solution, etch temperature, current density, and many other factors known by those skilled in the art. However, the tunnel distribution after conventional etching processes is not uniform. FIG. 1 shows a foil that has been etched and widened using conventional processes. Areas on the foil, such as rolling lines (produced by the foil manufacturing process), have a high tunnel density, while other areas have little or no tunnel initiation. Merged tunnels are also seen in FIG. 1, and cause the foil to become brittle.

Figure 2:
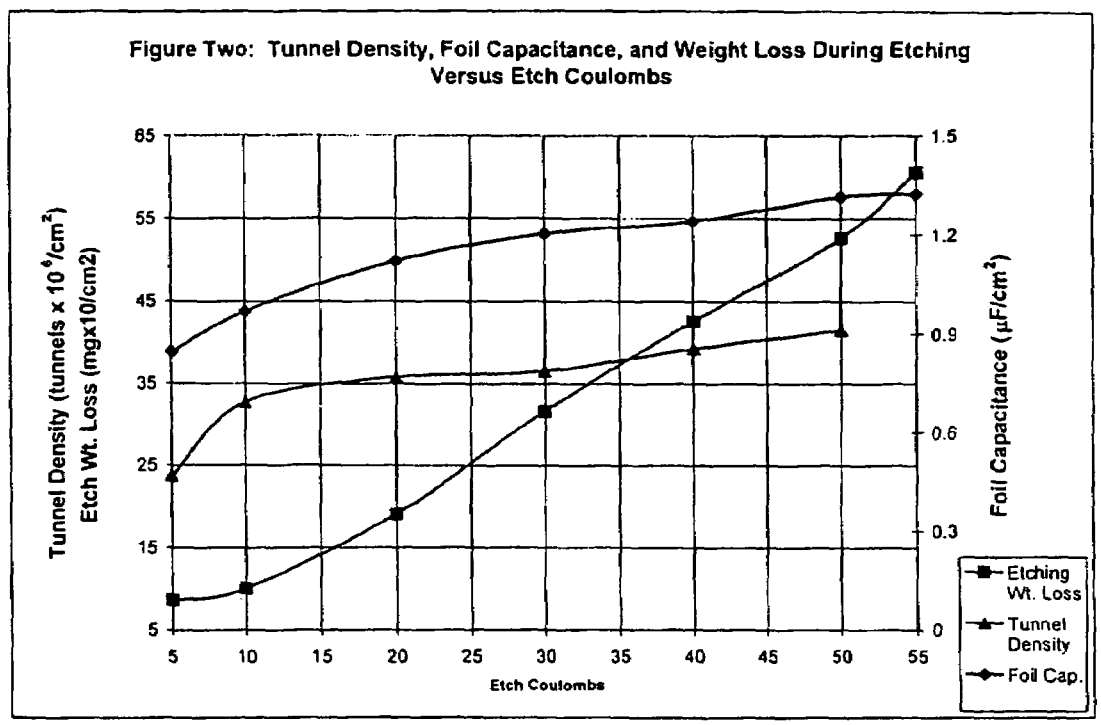
FIG. 2 shows a graph highlighting the effects of conventional etching processes on foil properties.

FIG. 2 shows a graph highlighting the effects of electrochemical etching on foil properties. Tunnel density (number of tunnels per $cm_2$), aluminum weight loss and foil capacitance are affected by the etch charge coulombs used during etching. As FIG. 2 shows, at high etch coulombs, the tunnels will merge and capacitance increases will level off at the areas of high tunnel density (high tunnel initiation). The efficiency of the etch coulombs (foil weight loss per coulomb) for increasing capacitance is reduced significantly at high etch coulombs. This shows that even though high degrees of etching result in higher capacitance, even tunnel distribution is necessary to achieve the most efficient etching, which produces foils exhibiting both high capacitance and high strength.

Figure 3:
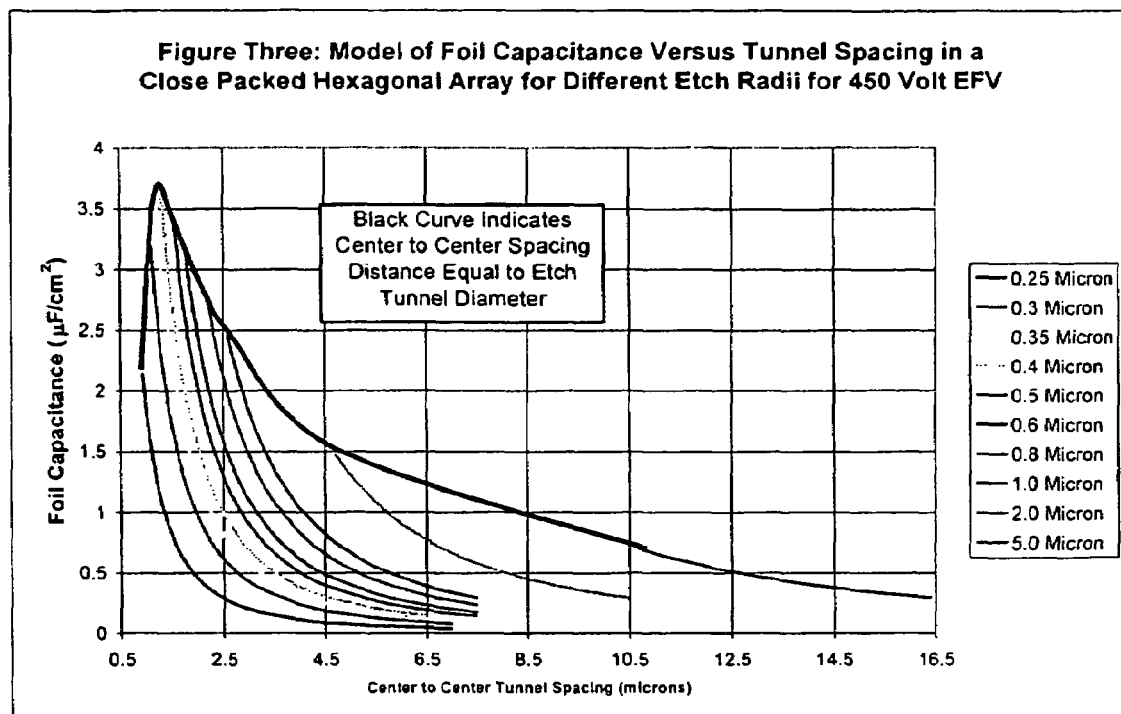
FIG. 3 shows results measuring capacitance verses tunnel spacing in a close-packed hexagonal array for different etching radii for a 450 Volt EFV (effective formation voltage) foils.

FIG. 3 shows the results of a theoretical study measuring capacitance verses tunnel spacing in a close-packed hexagonal array for different etching radii for 450 Volt EFV (effective formation voltage) foils. The results for maximum foil capacitance, indicate that at the appropriate tunnel spacing in a hexagonal close-packed array, the foil capacitance can be doubled from the 1.4 microfarads at 450 Volt EFV produced using conventional processes. Theoretically, the capacitor size, therefore, could be significantly reduced and still deliver the same energy, or higher reliability designs could be implemented. Therefore, a pattern etch in this configuration could give a significantly improved capacitor.

The present invention relates to a method of controlling the etching of a foil, such that tunnel initiation density and the location of tunnel initiation is controlled. By controlling the position of tunnel initiation, foils are etched more uniformly and have optimum tunnel distributions. This allows for the production of highly etched foils that maintain high strength and have high capacitance.

In an embodiment, the present invention is directed to a method of producing a highly etched electrode for a capacitor from a foil. The method comprises first applying a laser beam to the foil to form a plurality of marks on the foil surface and then etching the foil. In one embodiment, the method comprises creating a regular pattern of marks on the foil surface with the laser beam and then etching the foil. Preferably, the laser marks facilitate etching of the foil surface in areas near the marks and retard etching of foil surface inside the marks. After etching, the foil is further processed in a combination of optional steps such as forming and finishing steps.

The foil is made from any electrically conductive material. According to the present invention, the foil may be used as an electrode in a capacitor, such as an anode or alternatively as a cathode. Anode and cathode foils may be made of metal, metal alloy, or a metal composite material, for example aluminum. Aluminum foils are well known in the art and are commercially available. Due to the natural oxidation of the bulk aluminum foil surface, there is a thin layer of aluminum oxide coating the surface. Alternative materials include but are not limited to zinc, zirconium, tantalum, magnesium, niobium, and alloys of any or all of these metals.

Figure 4:
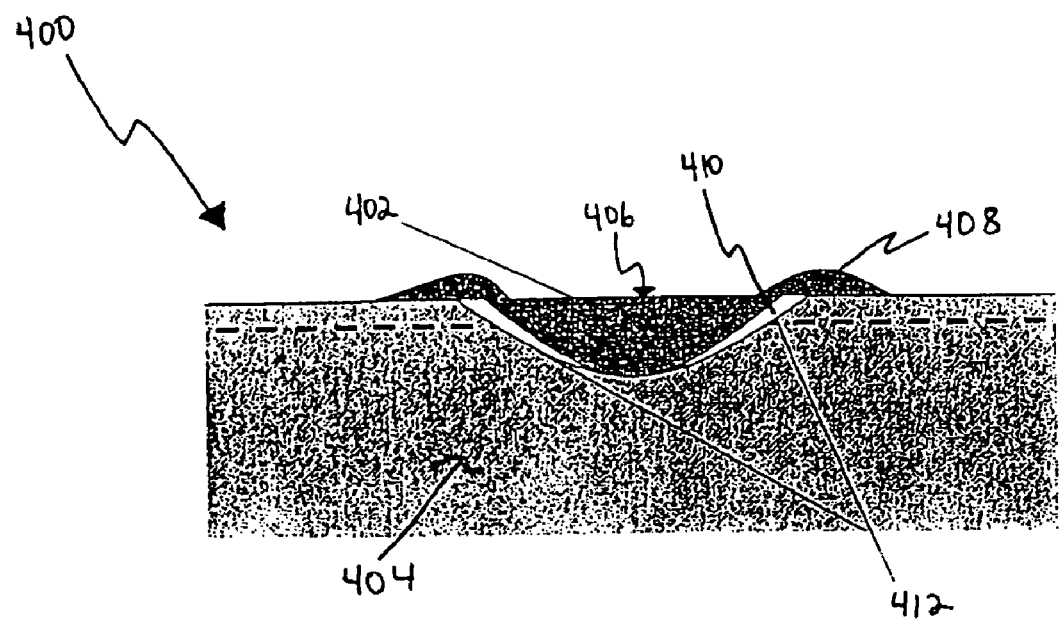
FIG. 4 shows a cross sectional diagram, 400, of an individual laser mark according to the present invention, 402.

The laser is applied to one surface of the foil to form a plurality of marks on the foil. Alternatively, the laser or a combination of lasers may be applied to one or both surfaces of the foil. FIG. 4 shows a cross sectional diagram, 400, of an individual laser mark, 402, according to the present invention, on an aluminum foil. The heat generated from the laser causes the bulk high cubicity aluminum, 404, to melt, and upon cooling, solidify into low cubicity aluminum, 406. Solidify is used herein to mean the transition in the physical state of the foil from a melted liquid to a solid as the foil cools. The final solid state can be either crystalline, amorphous or a mixture of the two. Elevated regions, 408, around laser mark, 402, are caused by the laser pushing aluminum to the side of the mark during the laser marking process. When mark 402 cools and resolidifies, low cubicity aluminum, 406, pulls away from high cubicity aluminum, 404, and voids 410 are created. Void 410 exposes fresh foil surface, 412. Fresh foil surface 412 differs from bulk foil surface 404, in that fresh foil surface 412 has less or no aluminum oxide coating the surface. Foil surface 412, therefore, etches at an increased rate compared to both mark 402 and bulk foil 404. This process allows one to precisely control the position of tunnel initiation.

Lasers that are used in the present invention include lasers that cause local heating when applied to the foil surface, for example the Nd:VO$_4$ laser. Alternative lasers include but are not limited to Nd:YAG, He:Ne, CO$_2$, Argon ion, semiconductor, and organic or inorganic dye lasers. The laser is applied to the foil at a scan rate about 20-500 mm/sec. The laser is applied to the foil for a time sufficient to cause melting or an increase in the local foil density and depends on the power and type of laser used.

The laser can be applied under inert conditions to prevent the formation of oxide on the foil surface. For example, the laser can be applied to the foil surface under an atmosphere of inert gas. Inert gases for ruse in the present invention include, but are not limited to nitrogen, argon, helium and the like.

The spot size of the laser determines the size of the mark. Mark, or pit, is used herein to mean the portion on the foil where a laser has been applied. Preferably, marks have an increased density compared to the areas of foil where no laser has been applied. For example, the mark is a dot or any other geometric shape. The mark can be any shape, including, but not limited to circular dots, stars, squares, diamonds, and other shapes. The mark can be of any size or diameter. It is preferred that the size of the mark or marks applied to the foil surface will result in an etched foil having high capacitance and high strength. Factors to consider in optimizing the mark size with foil capacitance and strength include, but are not limited to, the dimensions of the foil, the amount of charge used in etching the foil, the thickness of the foil, the type of foil used, and the type of laser used. If the spot size is large compared to the etch tunnel diameter, e.g. 20 pm, then many etch tunnels will initiate near the same mark and the etch tunnels will merge during later processing steps. This decreases foil strength in these areas. Therefore, the optimal spot size leads to even distribution of tunnels across the entire surface of the foil. Most preferably, the mark is a circular dot. The spot size of the laser is in the range from about 0.1 µm to about 10 µm, preferably from about 1 µm to about 5 µm. The laser is applied to the foil to create marks about 0.1-50 µm deep in the foil, preferably about 1-30 µm deep.

The laser is applied to the foil in a predetermined regular pattern, or alternatively in an irregular pattern. Moving the foil while holding the laser substantially stationary, or alternatively, moving the laser while holding the foil substantially stationary forms the predetermined pattern. A computer-controlled machine may control the movement of the foil or laser. A pattern may be programmed into a computer and the foil sheet then marked using a computer controlled laser. The invention allows for the production of detailed patterns of marks or pits on the foil.

The patterns of marks or pits on the foil can be any pattern, which includes, but is not limited to any regular, irregular or random pattern. For example, a series of marks in a line are engraved across a foil. Alternatively, a plurality of marks are engraved across the foil. Alternative patterns include, but are not limited to the patterns shown in FIGS. 5A-5D. FIG. 5A illustrates a design for a pattern in which marks are engraved in lines emanating from the center of the foil. FIG. 5B shows a second pattern of lines of marks engraved across the foil. FIG. 5C shows a third pattern in which circles of marks have been engraved around the foil center. Preferably, the marks are engraved on the foil surface in a close-packed hexagonal pattern, as shown in FIG. 5D. In the close-packed hexagonal pattern, the center-to-center distance between marks can be any distance. Preferably, the separation is about 0.1-10 µm, more preferably, 1-2 µm. Alternatively, a foil is engraved with a combination of patterns. A pattern is applied to one side of the foil. Alternatively, the pattern is applied to both sides of the foil or different patterns are applied to different sides of the foil.

The foil is etched according to any method that increases the surface area, preferably electrochemical etching, as is known to one skilled in the relevant art. Other methods include, but are not limited to roughing the foil surface mechanically and chemical etching. Electrochemical etching increases the surface area of the foil by electrochemically removing portions of the foil to creates etch tunnels.

In a embodiment, the anode foil may be electrochemically etched aluminum in order to enhance the surface area by an amount not less than 30 times. In a preferred embodiment, the anode foil is etched in an aqueous halide based etch solution, preferably a hydrochloric acid or sodium chloride solution, according to a conventional etch process; for example, U.S. Pat. No. 5,715,133 to Harrington et al. describes a suitable method of etching foil and is incorporated herein by reference in its entirety. The etch solution preferably consists of about 1.3% by weight sodium chloride, about 3.5% by weight sodium perchlorate, about 0.35% sodium persulfate, and deionized water. The etch solution preferably is heated to a temperature in the range of about 60° C. to about 95° C. The foil is etched at a DC current density of about 0.01 A/cm$^2$ to about 0.30 A/cm$^2$. A charge of about 20 coulombs/cm$^2$ to 100 coulombs/cm$^2$ is passed through the foil during the etching process, which requires an etch time in the range of about 2 minutes to about 12 minutes.

A laser beam is applied to the foil surface to create a regular or irregular pattern of marks and the foil is then etched. Upon etching, the areas where the laser was applied etch more slowly or not at all. Areas near the mark, specifically, foil surfaces exposed by the void areas created by the laser mark, etch at a higher rate. The laser marks, therefore, promote etching in predetermined areas of the foil. Also, the marks or pits, in which little or no etching occurs, stop the propagation of cracks through the heavily etched portions. This pre-etch laser beam marking facilitates uniform etching across the foil and increases etched foil strength and ductility, while allowing for relatively heavy foil etching, which gives high gain, high strength electrodes.

The invention also includes an etched anode foil produced by the methods described above. Anode foils are punched from etched anode sheets. Foil sheets etched in accordance with the present invention and the resulting anode foils exhibit high capacitance while maintaining high strength.

In practice, a capacitor assembly process is used to produce capacitors from etched foil. The assembly process includes applying the laser to form marks and etching as described above and a plurality of optional processing steps.

After etching, the foil is removed from the etch solution and rinsed in deionized water. The tunnels formed during the initial etch are then widened, or enlarged, in a secondary etch solution, typically an aqueous based nitrate solution, preferably between about 1% to about 20% aluminum nitrate, more preferably between about 10% to about 14% aluminum nitrate, with less than about 1% free nitric acid. The etch tunnels are widened to an appropriate diameter by methods known to those in the art, such as that disclosed in U.S. Pat. No. 4,518,471 and U.S. Pat. No. 4,525,249, both of which are incorporated herein by reference.

After the etch tunnels have been widened, the foil is again rinsed with deionized water and dried. Finally, a barrier oxide layer is formed onto one or both surfaces of the metal foil by placing the foil into an electrolyte bath and applying a positive voltage to the metal foil and a negative voltage to the electrolyte. Preferably, the dielectric oxide layer is grown anodically in an aqueous formation electrolyte, with a minimum voltage that is 10% greater than the intended working voltage of the finished capacitor. The barrier oxide layer provides a high resistance to current passing between the electrolyte and the metal foils in the finished capacitor, also referred to as the leakage current. High leakage current can result in the poor performance and reliability of an electrolytic capacitor. In particular, high leakage current results in greater amount of charge leaking out of the capacitor once it has been charged.

The formation process consists of applying a voltage to the foil through an electrolyte such as boric acid and water or other solutions familiar to those skilled in the art, resulting in the formation of an oxide on the surface of the anode foil. The preferred electrolyte for formation is a 100-1000 μS/cm, preferably 500 μS/cm, citric acid concentration. In the case of an aluminum anode foil, the formation process results in the formation of aluminum oxide ($Al_2O_3$) on the surface of the anode foil. The thickness of the oxide deposited or "formed" on the anode foil is proportional to the applied voltage, roughly 10 to 15 Angstroms per applied volt.

The etched and formed anode foils are cut and the capacitor is assembled.

It is understood to one of ordinary skill in the art that additional steps, or an alternative combination of steps, can be used in processing an etched anode foil. Additional steps include, but are not limited to rinsing, drying, hydrating, capacitance testing, annealing, and capacitor assembling. These steps can be carried out using any method known to one skilled in the art.

In another embodiment, the present invention relates to an electrolytic capacitor comprising etched aluminum anode foils, which have been prepared using the methods of the present invention. Such capacitors can be made using any suitable methods known in the art. Non-limiting examples of such methods are disclosed, e.g. in the following references: U.S. Pat. Nos. 4,696,082 to Fonfiia et al., 4,663,824 to Kenmochi, 3,872,579 to Papadopoulos, 4,541,037 to Ross et al., 4,266,332 to Markarian et al., 3,622,843 to Vermiyea et al., and 4,593,343 to Ross, each of which is incorporated herein by reference.

Electrolytic capacitors manufactured with anode foils etched according to the present invention may be utilized in ICDs, such as those described in U.S. Pat. No. 5,522,851 to Fayram, incorporated herein by reference. The increased capacitance per unit volume of the electrolytic capacitor will allow for a reduction in the size of the ICD.

Having now generally described this invention, the same will be understood by reference to the following examples, which are provided herein for purposes of illustration only and are not intended to be limiting unless otherwise specified.

EXAMPLES

Example 1

Figure 6:
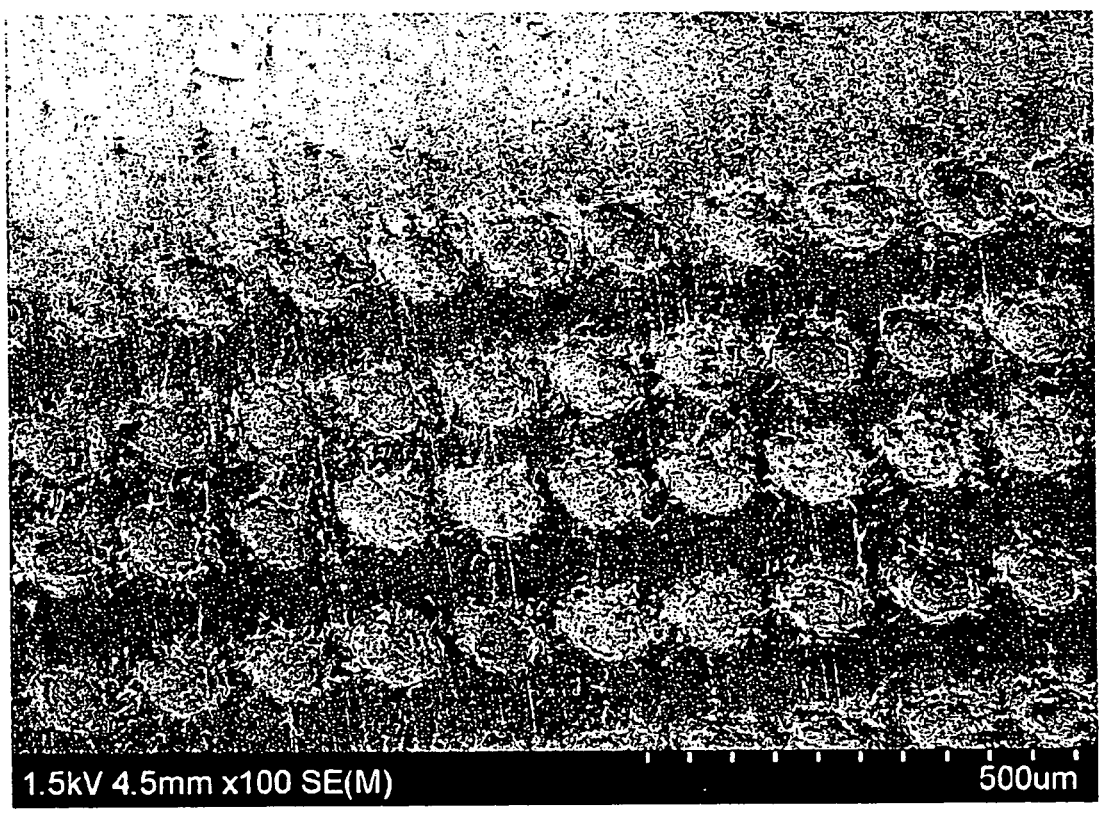
FIG. 6 shows a SEM picture of a foil marked using a laser in accordance with the methods of the present invention.

A laser was applied to an aluminum foil comprising about 97% high cubicity recrystallized aluminum to create a pattern of marks. A Nd:YAG laser was used to mark the foil. FIG. 6 shows a SEM picture of the resulting foil with the laser marks on the foil. As can be seen in the image, the marks are approximately circular dots. The dots also appear to be pits with elevated edges. This confirms the mark structure shown in FIG. 4.

Example 2

Figure 7:
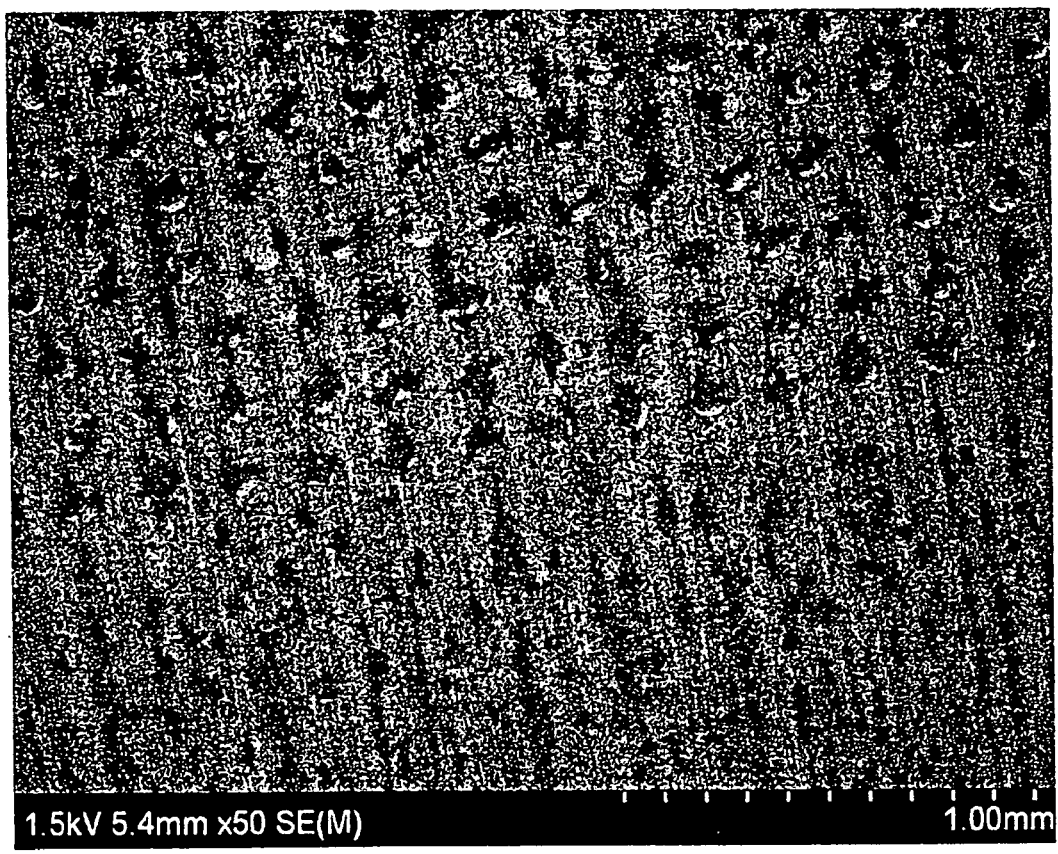
FIG. 7 shows a SEM picture of a laser marked foil after etching in accordance with the methods of the present invention.

In this example, a portion of a foil, similar to that of Example 1, was marked using a laser as in Example 1. The marked foil was electrochemically etched in aqueous anode electrolyte comprising about 500 PPM sulfate, about 2.6% sodium perchlorate, about 1.3% sodium chloride, and about 20% glycerol, at a temperature of about 80° C. The current density was about 0.15 amps/cm$^2$. FIG. 7 shows a SEM picture of the laser marked foil after etching. In the portion where the laser was applied to create marks, the tunnel initiation is concentrated near the edges of the marks. In the unmarked portion, the tunnel initiation is concentrated near the rolling lines. This example shows that the laser marked spots facilitate etching more strongly than the rolling lines. This is clear evidence that the marks allow for precise positional control of tunnel initiation.

Example 3

Figure 8:
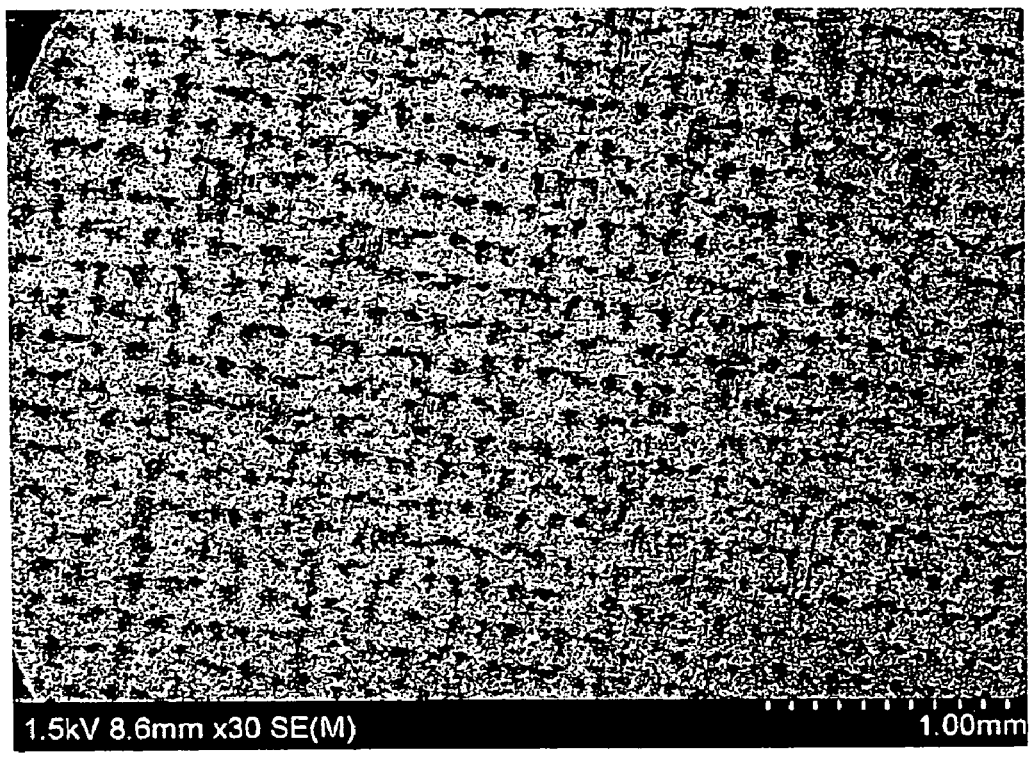
FIG. 8 shows a SEM picture of an etched foil having laser marks applied under an Argon atmosphere in accordance with methods of the present invention.
Figure 9:
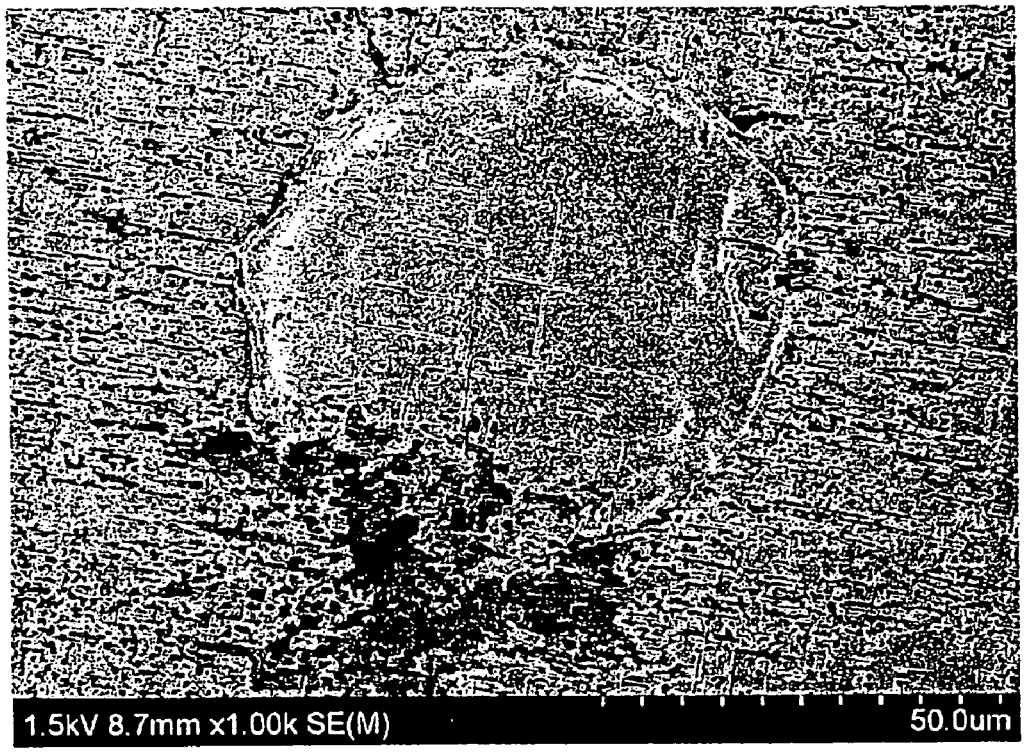
FIG. 9 shows a SEM picture of the etched foil of FIG. 8, with one mark magnified.

In this example, a regular pattern of marks was applied to an aluminum foil comprising about 97% high cubicity recrystallized aluminum. A Nd:YAG laser was used to mark the foil. The same marking conditions were used as in Example 1, however, the laser marking of the foil was performed under an Argon atmosphere. The Argon environment was used to reduce the amount of thermal oxide grown on the foil during the marking process. The chamber for laser marking the foil was purged with Argon for about 80 minutes before marking. After the laser marking process, the foil was etched in the sulfate etch solution and using the conditions described in Example 2. FIG. 8 shows a SEM picture of the etched foil marked under Argon. The tunnel initiation is still concentrated near the laser mark edge, as in Example 2. FIG. 9 shows a SEM picture of the same etched foil, with one mark magnified, which clearly shows tunnel initiation near the edge of the mark, with little tunnel initiation in the laser mark. This example shows that the laser marking process facilitates tunnel formation near the edge of the marks. Also, this example shows the change in density of the aluminum in the mark reduces the tunnel initiation density in the mark.

Example 4

Figure 10:
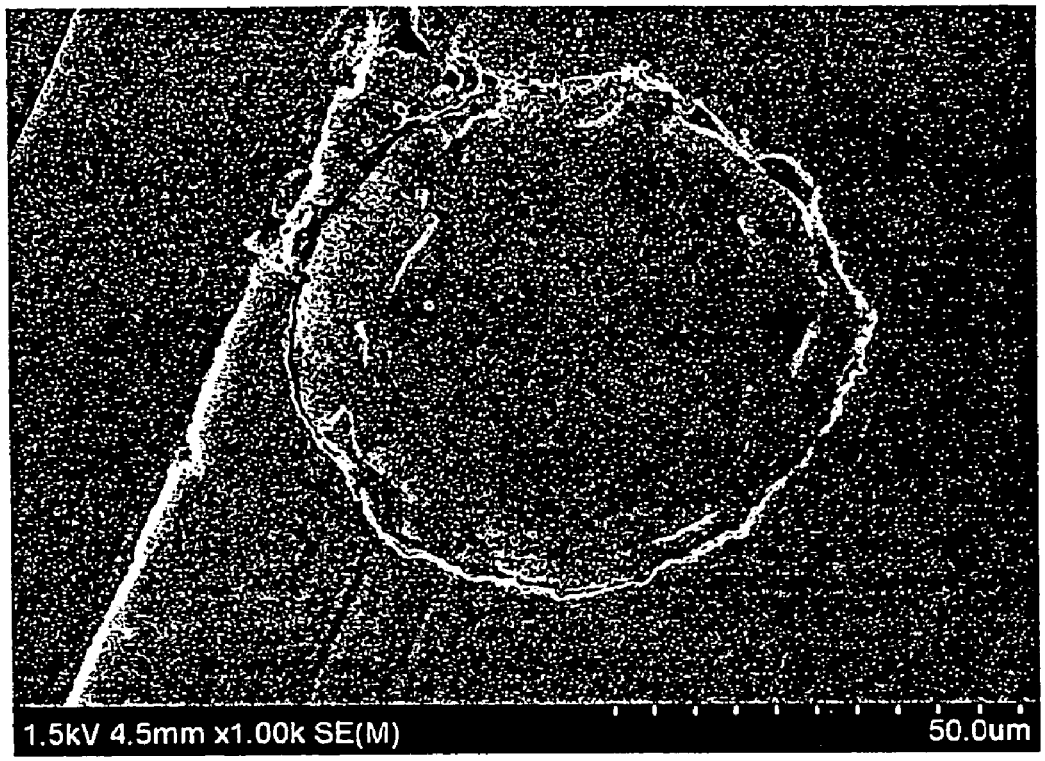
FIG. 10 shows a SEM picture of a laser marked foil after plasma etching the foil in accordance with methods of the present invention.

In this example, a laser was applied to a foil surface using conditions similar to Example 1. The laser marked foil was then plasma etched for 10 minutes, to provide a fresh foil surface, according to methods well known to one skilled in the relevant art. During plasma etching, the aluminum is removed uniformly throughout the foil surface. FIG. 10 shows a SEM picture of the laser marked foil after the plasma etching. This example confirms that void spaces, as shown in FIG. 4, can be observed near the edge of the laser mark, formed during the laser marking process.

Example 5

Figure 11:
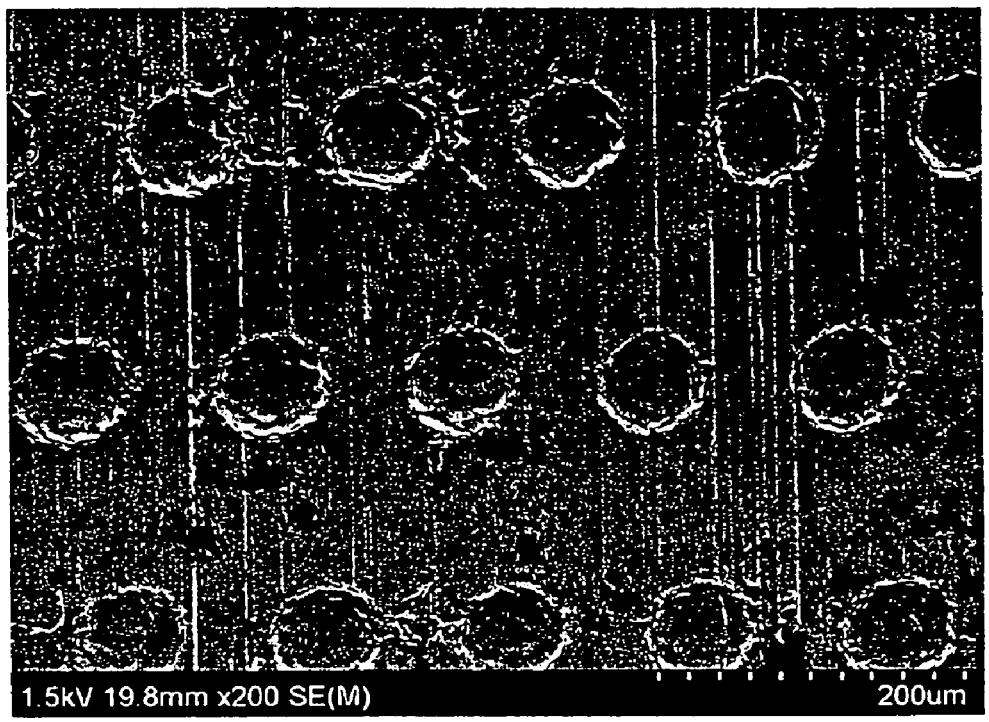
FIG. 11 shows a SEM picture of the laser marked foil after plasma and electrochemical etching in accordance with methods of the present invention.

In this example, a high cubicity foil was laser marked using conditions similar to Example 1. The laser marked foil was plasma etched for 5 minutes. Foils can be plasma etched using any method known to one skilled in the relevant art. For example, a foil is plasma etched using an active ion plasma, which can be used to remove aluminum uniformly from the foil surface. In active ion plasma etching, the plasma beam reacts with the surface to create volatile products that are easily removed. The result is a fresh aluminum foil surface having little or no passivating oxide on the surface. The laser marked and plasma etched foil was then electrochemically etched using the sulfate electrolyte of Example 2 and 18 Coulombs/cm$^2$. FIG. 11 shows a SEM picture of the laser marked foil after plasma and electrochemical etching. As a result of the plasma etching, the thin layer of natural oxide is removed from the bulk surface of the foil. Therefore, the bulk surface of the foil and the foil surfaces near the marks both have fresh surfaces and would be expected to etch at the same rate. The picture shows tunnel initiation was not concentrated around the edge of the laser mark. The 5 minute plasma etch removed the natural thermal oxide on the bulk surface of the aluminum. Because the passivating natural oxide has been substantially removed, tunnel initiation occurs more randomly over the foil surface as positional control of the tunnel initiation is lost. This example shows that removal of natural oxide facilitates electrochemical tunnel initiation. Particularly, it shows laser marks can give positional control to the formation of fresh foil surface and, therefore, the laser marks can give control to tunnel initiation by exposing foil surface not covered by natural oxide.

Example 6

Figure 12:
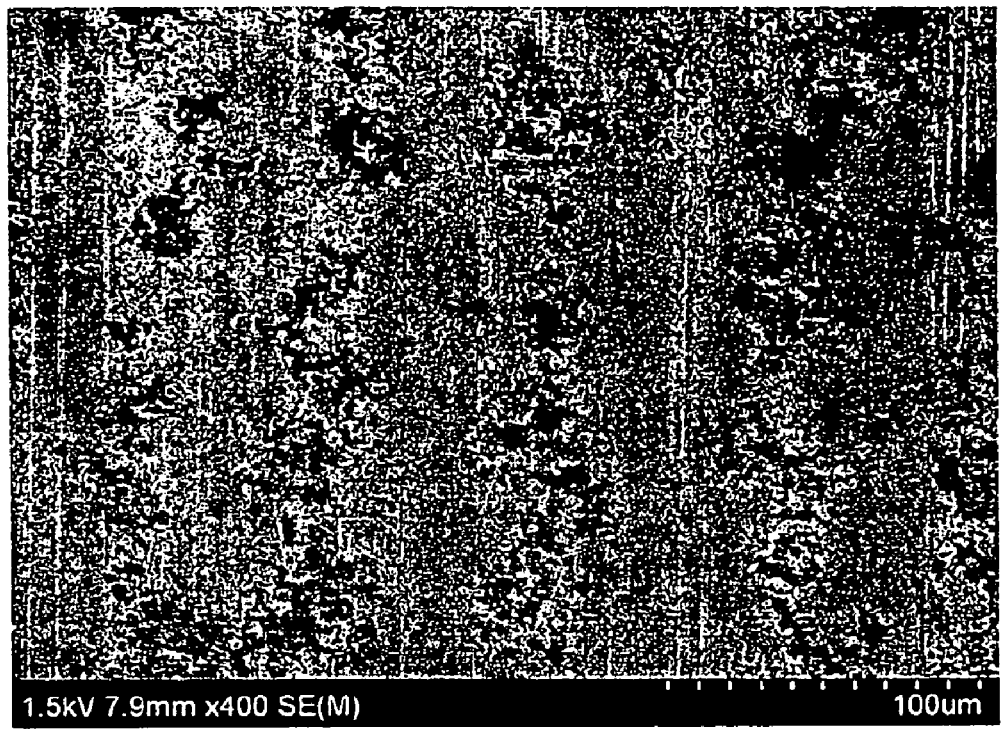
FIG. 12 shows a SEM picture of an electrochemically etched foil in accordance with methods of the present invention.
Figure 13:
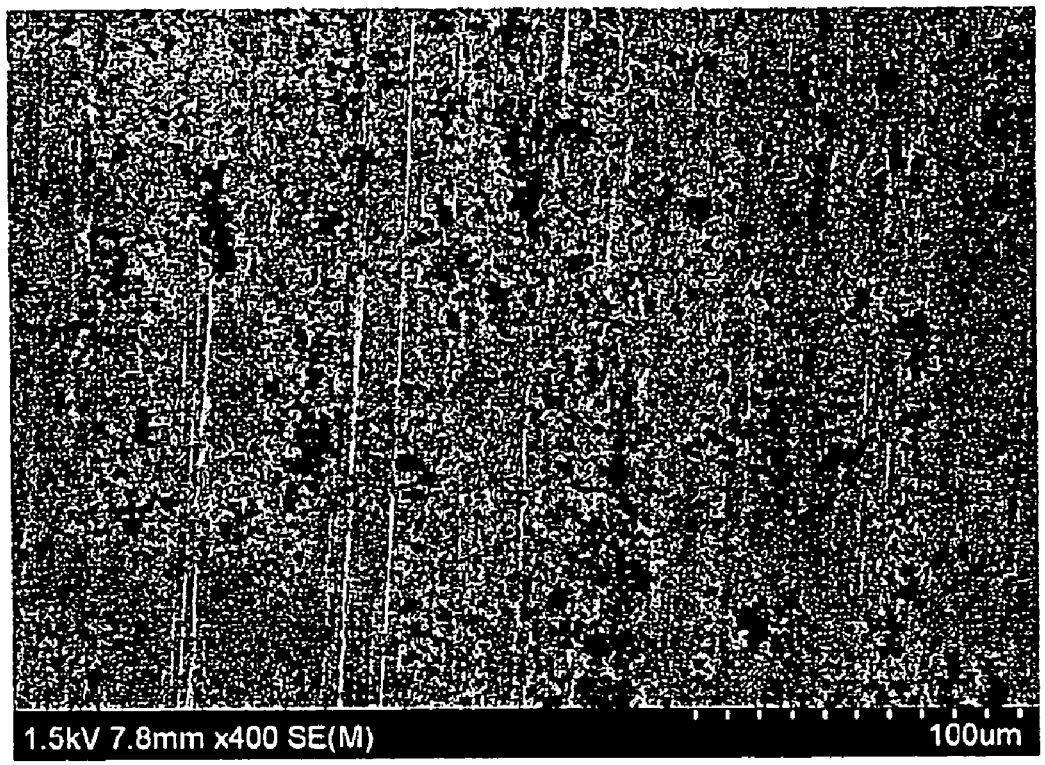
FIG. 13 shows a SEM picture of a foil, which was plasma etched and electrochemically etched in accordance with methods of the present invention.

In this experiment two high cubicity aluminum foils were electrochemically etched to 18 Coulombs/cm$^2$ using conditions similar to Example 2. No laser marks were applied to the foil before electrochemical etching. One of the foils was first treated with a plasma etch for 5 minutes before the electrochemical etching. FIG. 12 shows a SEM picture of the first etched foil, which was not plasma etched. Without the laser markings to direct tunnel initiation, and without plasma etching to uniformly remove natural oxide, the tunnel initiation occurs most readily on the rolling lines. FIG. 13 shows a SEM picture of the second foil, which was plasma etched and electrochemically etched. Without laser markings to precisely direct tunnel initiation, but with the plasma etching to uniformly remove natural oxide, the tunnel initiation is more random across the foil surface and does not concentrate on the rolling lines. This experiment shows that without laser marks, the foil is etched in a random fashion, and that the laser marks can be used to selectively and precisely initiate tunnel formation in areas near the laser marks.

While the invention has been particularly shown and described with reference to preferred embodiments thereof, it will be understood by those skilled in the art that various changes in form and details may be made therein without departing from the spirit and the scope of the invention.

What is claimed is:

1. A method for producing a highly etched foil, comprising:
    (a) applying a laser beam to portions of said foil to cause local melting of said portions to form a plurality of pits with elevated edges on said foil to expose near each of said pits a fresh foil surface with substantially no oxide coating; and
    (b) etching said foil; wherein said etching is facilitated at said fresh foil surfaces, as compared to the remaining bulk foil.

2. The method of claim 1, wherein said pits are formed about 0.1-50 μm deep in said foil.

3. The method of claim 2, wherein said pits are formed about 1-30 μm deep in said foil.

4. The method of claim 1, wherein said pits have a diameter of about 0.1-10 μm.

5. The method of claim 4, wherein said pits have a diameter of about 1-5 μm.

6. The method of claim 1, wherein said pits are substantially circular.

7. The method of claim 1, wherein said step of applying a laser beam comprises: applying said laser beam to create an irregular pattern of pits on said foil.

8. The method of claim 1, wherein said plurality of pits are formed in a close-packed hexagonal array.

9. The method of claim 1, wherein said pits are formed with about 0.1-10 μm separation between said pits from center-to-center.

10. The method of claim 9, wherein said pits are formed with about 1-2 μm separation between said pits from center-to-center.

11. The method of claim 1, wherein said step of applying a laser beam comprises: applying a Nd:VO$_4$, Nd:YAG or a CO$_2$ laser to said foil.

12. The method of claim 1, wherein the step of applying a laser beam comprises: applying a laser beam at a scan rate in the range of about 20-500 mm/sec.

13. The method claim 1, wherein said step of applying a laser beam further comprises: applying said laser beam to both sides of said foil.

14. The method of claim 1, wherein said etching step comprises: etching said foil electrochemically.

15. The method of claim 14, wherein said etching step further comprises:
   (1) placing said foil in an etch solution comprising about 1.3 wt % sodium chloride, about 3.5 wt % sodium perchlorate and about 0.35 wt % sodium persulfate; and
   (2) applying a charge of about 20-100 Coulombs/cm$^2$ at a current density of about 0.01-0.3 Amp/cm$^2$ to said foil for about 2-12 minutes.

16. The method of claim 1, wherein said step of applying a laser beam comprises applying said laser beam under inert conditions.

17. A method for the positional control of tunnel initiation in the electrochemical etching of a metal foil, comprising:
   (a) applying a laser beam to at least one surface of said foil to cause local melting of portions of said foil to form a pattern of pits with elevated edges on said foil to expose near each of said pits a fresh foil surface with substantially no oxide coating; and
   (b) etching said foil electrochemically to produce a plurality of tunnels; wherein the initiation of said tunnels is concentrated at said fresh foil surfaces, as compared to the remaining bulk foil.

18. The method of claim 17, wherein said pattern of pits are formed in a close-packed hexagonal array.

19. A method for producing a high strength, high capacitance aluminum foil, comprising:
   (a) applying a laser beam to portions of at least one surface of an aluminum foil to cause local melting of said foil to form a plurality of pits with elevated edges on said foil to expose near each of said pits a fresh foil surface with substantially no oxide coating; and
   (b) electrochemically etching said foil; wherein said etching is facilitated at said fresh foil surface, as compared to the remaining bulk foil, and etching is retarded inside said pits.

20. The method of claim 19, wherein said pits have a diameter of about 0.1-10 μm.

21. The method of claim 19, wherein said pits are formed with about 0.1-10 μm separation between said pits from center-to-center.

22. A method for producing a highly etched foil, comprising:
   (a) applying a laser beam to portions of said foil to cause local melting of said portions to form a plurality of individual, spaced-apart pits with elevated edges on said foil to expose near each of said pits a fresh foil surface with substantially no oxide coating; and
   (b) etching said foil; wherein said etching is facilitated at said fresh foil surfaces, as compared to the remaining bulk foil.

23. A method for producing a highly etched foil, comprising:
   (a) applying a laser beam to portions of said foil to cause local melting of said portions to form a plurality of pits with elevated edges on said foil to expose near each of said pits a fresh foil surface with substantially no oxide coating, wherein said pits are substantially circular and wherein said pits are formed with about 0.1-10 μm separation between said pits from center-to-center; and
   (b) etching said foil; wherein said etching is facilitated at said fresh foil surfaces, as compared to the remaining bulk foil.

* * * * *